(12) United States Patent
Arques

(10) Patent No.: US 6,949,962 B2
(45) Date of Patent: Sep. 27, 2005

(54) DEVICE FOR REDUCING THE LAG AND THE DARK CURRENT IN A PARTICLE DETECTOR, IN PARTICULAR A PHOTON DETECTOR

(75) Inventor: Marc Arques, Grenoble (FR)

(73) Assignee: Commissariat a l 'Energie Atomique, Paris (FR)

( * ) Notice: Subject to any disclaimer, the term of this patent is extended or adjusted under 35 U.S.C. 154(b) by 0 days.

(21) Appl. No.: 10/480,359

(22) PCT Filed: Jun. 13, 2002

(86) PCT No.: PCT/FR02/02028
§ 371 (c)(1),
(2), (4) Date: Dec. 9, 2003

(87) PCT Pub. No.: WO02/103390
PCT Pub. Date: Dec. 27, 2002

(65) Prior Publication Data
US 2004/0232949 A1 Nov. 25, 2004

(30) Foreign Application Priority Data
Jun. 15, 2001 (FR) ............................. 01 07856

(51) Int. Cl.$^7$ .................................................. H03C 3/00
(52) U.S. Cl. ........................ 327/101; 327/62; 327/361
(58) Field of Search .......................... 327/58, 62, 100, 327/101, 361

(56) References Cited

U.S. PATENT DOCUMENTS

| | | | |
|---|---|---|---|
| 5,012,498 A | 4/1991 | Cuzin et al. | |
| 5,225,682 A | 7/1993 | Britton, Jr. et al. | |
| 5,450,029 A | * | 9/1995 | Jacobs et al. ............... 327/348 |

FOREIGN PATENT DOCUMENTS

| | | |
|---|---|---|
| EP | 1094334 A2 | 4/2001 |
| FR | 2626432 | 7/1989 |

* cited by examiner

Primary Examiner—Kenneth B. Wells
(74) Attorney, Agent, or Firm—Thelen Reid & Priest, LLP

(57) ABSTRACT

The assembly formed by the amplifier 34, the transistor 36 and the capacitor 28 fulfills the function of the amplifier 8 and the impedance 10 of the device shown in FIG. 4.

14 Claims, 4 Drawing Sheets

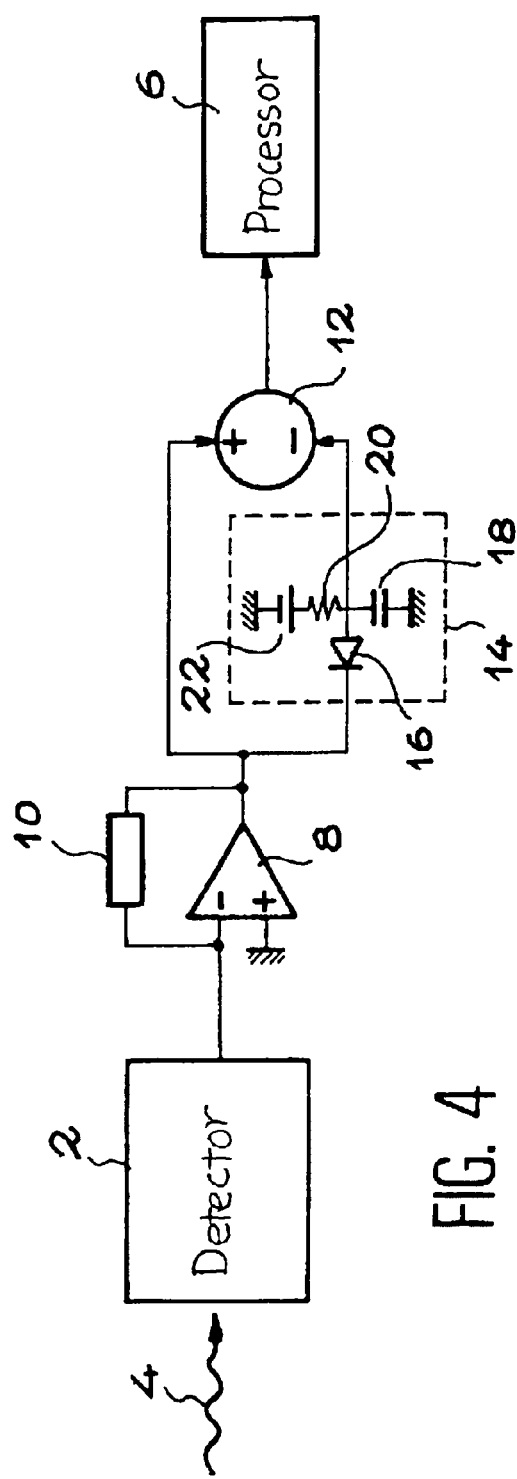
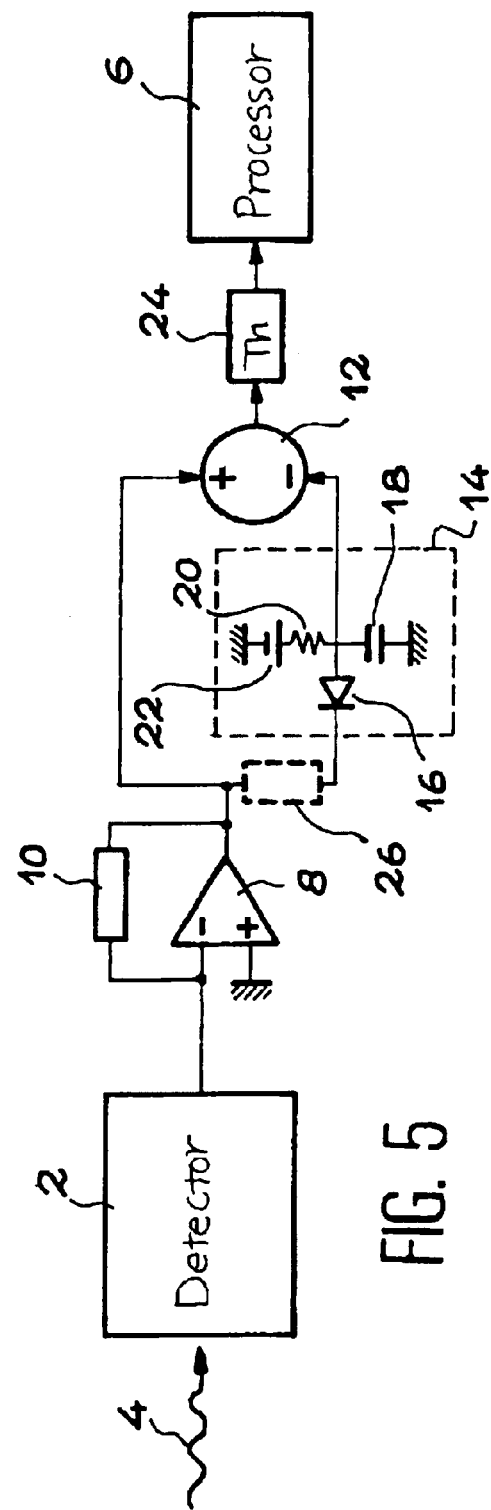
FIG. 4
FIG. 5

DEVICE FOR REDUCING THE LAG AND THE DARK CURRENT IN A PARTICLE DETECTOR, IN PARTICULAR A PHOTON DETECTOR

CROSS-REFERENCE TO RELATED APPLICATION

This application claims priority based on International Patent Application No. PCT/FR02/02028, entitled "Device for Reducing the Lag and the Dark Current of a Particle Detector, and in Particular a Photon Detector" by Marc Arques, which claims priority of French application no. 01 07856, filed on Jun. 15, 2001, and which was not published in English.

TECHNICAL FIELD

The present invention relates to a device intended to improve the signal provided by a particle detector, in particular a photon detector, with the aim of reducing the lag and the dark current of this detector.

This device may be a point or matrix detector (linear in particular).

The invention makes it possible to reduce the detector lag. It is therefore useful when this detector shows this phenomenon in an intrinsic way. This is the case, especially, for many X-ray or gamma-ray detectors which, in order to detect these radiations, use semiconductor materials such as amorphous silicon, CdTe, PbO, $PbI_2$, $HgI_2$, Se and TlBr, because their crystalline defects produce a lag.

This phenomenon is also encountered in assemblies comprising a scintillator and a photodetector, the scintillator being, for example, in caesium iodide or in gadolinium oxysulfide, and the photodetector being, for example, in silicon (amorphous, polycrystalline or monocrystalline) or in germanium.

The invention also makes it possible to reduce the dark current of detectors, which is often very useful because this current is in particular a function of the temperature and thus disturbs the images produced by these detectors.

The invention applies in particular:

to X-ray detectors used in fluoroscopy mode and therefore at video rate, to X-ray detectors intended for alternating sequences of high dose images and sequences of low dose images, in the case where it is required that the latter should not be polluted by a memory of preceding images, obtained at high dose, which is the case for cardiology or fluoroscopy, to X-ray detectors intended for radiography, in which case there should be no lag between one image and the next (even though the imaging rate is low, of the order of 1 second), to detectors intended for X-ray tomography, that must be able to "follow" a lighting attenuation of the order of $10^5$ in about one millisecond, to X-ray or gamma detectors used for spectrometry, meaning that the energy of each incident photon is measured, the lag of these detectors creating, after detection of a photon, an offset which fades slowly with time and which disturbs the energy measurement of the following photon, to X-ray or gamma detectors with which photons exceeding the predefined energy threshold are counted, detectors for which, after detection of a photon, the lag transmits an offset that fades slowly with time and, by addition to the following photon, modifies the effective detection threshold of this photon and to detectors of other particles, for example neutrons or protons.

STATE OF PRIOR ART

In detectors operating in integration mode, the lag reduction is usually obtained by a long and difficult adaptation of the manufacturing technique of these detectors or by computer post-processing of information acquired by means of these detectors.

The first solution is preferable, but comes up against the limits of know-how about the manufacture of the constitutive materials of detectors.

The second solution requires computer processing means that may be significant, especially since the lag of a detector from an instant t generally depends on all the lighting it has received before this instant t and not only the last image produced before the instant t. This limits the efficiency of post-processing corrections.

In order to reduce the lag of detectors operating in counting mode, it is known how to suppress the continuous component of the current provided by a detector of this type using a high-pass filter. But each pulse is then followed by a negative undershoot, linked to the cut-out frequency of this high-pass filter.

Even though the corresponding time lag may often be shorter than the lag of the detector and that recuperation acceleration devices exist, this known solution for lag reduction requires the rate of arrival of the particles to be detected, for example photons, to be relatively slow so that the detector has recovered its balance level before the following event.

In all the following, for simplification, only X-ray detectors will be taken into consideration and only detectors providing electrons. But those skilled in the art will easily be able to transpose the corresponding description to the other particle detectors mentioned above as well as to detectors providing holes.

First of all the phenomenon of lag will be considered briefly.

During the absorption of a photon X in a photodetector, a certain quantity N of pairs electron-hole pairs is created. Problems appear when the electrons and/or holes are trapped.

One of these problems results from the fact that, for a same quantity N of charges created during absorption of the photon X, the number of charges collected varies in function of the location where this photon is absorbed. Given that the mobility and lifetimes of electrons and holes are in general different, the sum Q1+Q2, where Q1 (or Q2 respectively) is the total charge of electrons (or holes respectively) trapped during their movement towards the anode (or cathode respectively) of the photodetector, is not constant.

The present invention does not relate to this problem and, in the following, it is considered, for simplification, that the number Q1+Q2 is constant.

Lag is another problem resulting from the trapping of electrons and/or holes.

In the rest of the description, it will be seen that the detection of each photon first creates an initial current, brief and intense, called a pulse in the following, and which corresponds to the migration of charges, without trapping, towards the detector's electrodes, and then a second current, longer but of lower intensity, which is called the tail in the following and which is due to trapping.

One of the effects of the lag, remedied by the present invention, results from the fact that, during the time they exist, the trapped charges Q1 and Q2 modify the current circulating in the detector and generally increase this current.

In particular, when absorption of the photon X is followed by a dark period, a tail exists after the pulse of the current corresponding to the evacuation of non-trapped charges. During this tail the current is higher than the dark current. This rise can be explained by:
(a) a modification of the concentration of charge in the semiconductor material by the trapped charges,
(b) the creation of electron-hole pairs, encouraged locally by the trapped charges,
(c) the generation of a current due to the freeing of trapped charges and
(d) the modification of the distribution of the electric field in the detector by the trapped charges.

During the tail, the total charge collected in the external reader circuit, to which the detector is connected, can significantly increase the charge collected during the initial pulse. Thus there is a photoconduction gain that is usually harmful because it is obtained at the cost of a lag.

FIGS. 1 to 3 are intended to give a diagrammatic representation of the effect of the lag which the present invention aims at remedying. They relate to the simplified case where a single type of carrier moves. But the invention is also applicable if the two types of carrier move.

FIG. 1 shows the response R to a single photon, for the case of an ideal detector, meaning without trapping, this response being the curve of intensity variations Int of the current provided by the detector in function of time t.

FIG. 2 shows the response to a single photon for the case of a detector where the phenomenon of trapping takes place. Zone I corresponds to the pulse (evacuation of the created charges that do not undergo trapping), zone II corresponds to the tail due to trapping, and zone III corresponds to the charge deficit due to trapping at the beginning of the pulse.

FIG. 3 shows the response to a burst of photons, also in the case of a detector where the phenomenon of trapping takes place. Zone I corresponds to the lag at lighting, zone II corresponds to the lag at extinction, each zone III corresponds to the unitary response to a photon, line C corresponds to the overall current and the separation G corresponds to the gain in photoconduction.

Like the tail, the dark current adds to the photocurrent and varies as a function of time, in particular because of temperature changes. The invention also aims at reducing this dark current.

A device for improving the signal provided by a detector of X-rays is already known from the following document: FR 2626432A, Tomography apparatus for X-rays, invention of Marc Cuzin and Francis Glasser, corresponding to EP0326471A and to U.S. Pat. No. 5,012,498A.

In this known device, after each pulse, a measurement is taken of the residual current and the residual current thus measured is subtracted from the value of the pulse.

However, this measurement is punctual and already planned during the sequencing of measurements. It is not certain that it corresponds at the current minimum between two successive pulses and, if these two successive pulses are too close together, the measurement error can be significant, in particular in the case of a pulse train.

DESCRIPTION OF THE INVENTION

The aim of the present invention is to remedy the preceding disadvantage.

The invention proposes following "step by step" the evolution of the signal provided by the detector and to actually detect the current minimum between two successive pulses.

Furthermore, the memory of a minimum detected at a given moment must fade progressively in order that the ulterior minima can also be detected.

In short, the aim of the present invention is a device for improving the signal provided by a particle detector, in particular a photon detector, this detector being able to provide current pulses when it receives these particles, the device comprising means for transforming current pulses into voltage pulses, this device being characterised in that it also comprises:

means for detection of a voltage extremum between a voltage pulse provided by the transformation means and a following voltage pulse means for subtracting the value of the extremum detected in this way from this voltage pulse provided by the transformation means, in such a way as to improve the corresponding signal, provided by the detector, and means for resetting the extremum.

According to a first preferred embodiment of the device, the aim of the invention, the transformation means can comprise an amplifier provided with a feedback impedance.

This impedance is, for example, a resistor or a capacitor between the terminals of which a resistor is mounted.

According to a second preferred embodiment of the invention, the transformation means comprise:

a first capacitor, a first transistor through which the charges produced in the detector, by the particles detected by the latter, are transferred to the first capacitor and a first amplifier envisaged for polarising this first transistor.

According to a particular embodiment of the invention, the voltage extremum detection means comprise:

a diode, mounted between the output of the transformation means and the subtraction means, and a capacitor mounted between a continuous voltage source and a terminal common to the subtraction means and the diode.

According to another preferred embodiment of the invention, the detection means for the voltage extremum comprise:

a second amplifier connected to a first capacitor, a second capacitor mounted between the output of the extremum detection means and a continuous voltage source, a resistor mounted between the output of the extremum detection means and a continuous voltage source, means for voltage rectification connecting the second amplifier to the second capacitor, and a third amplifier provided for controlling the value of the extremum detected at a predefined voltage (the voltage sources being able to be the same or different).

The means for voltage rectification can be chosen from amongst a diode, an N type MOS transistor and a P type MOS transistor.

According to a further preferred embodiment of the invention, the subtraction means comprise:

a third capacitor, a second transistor through which the pulse part of the charge arriving at a first capacitor is sent on to the third capacitor, and a fourth amplifier provided for reducing the apparent impedance of the second transistor.

The subtraction means can furthermore comprise another resistor mounted between the first capacitor and the second transistor.

According to a particular embodiment of the invention, the resetting means comprise a resistor mounted between a terminal of the subtraction means and a voltage source.

According to another particular embodiment, the device further comprises means for suppressing the background noise which might disturb the signal provided by the subtraction means.

The noise suppression means can comprise means for voltage offset of the signal, set between the transformation means output and a subtraction means terminal.

These voltage offset means are intended to simplify the means for suppressing background noise by enabling them to operate relative to a reference voltage which can be nil.

BRIEF DESCRIPTION OF THE DRAWINGS

The present invention will be better understood by reading the description of examples of embodiments given below, that are purely indicative and in no way limiting, with reference to the attached drawings on which:

FIG. 4 is a diagram of a particular embodiment of the device that is the subject of the invention, FIG. 5 illustrates diagrammatically a variant of the device in FIG. 4, in which an offset has been added on the minimum detection line of this device.

DETAILED DESCRIPTION OF PREFERRED EMBODIMENTS

Figure 1:
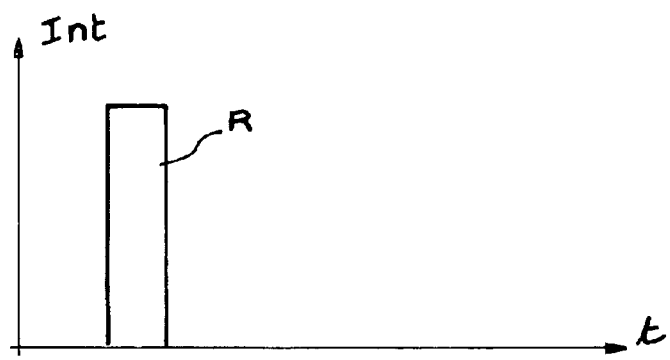
FIGS. 1 to 3 illustrate respectively the response to a single photon ideal detector, the response to a single photon detector with trapping, and the response of a detector with trapping to a burst of photons, already described above.
Figure 2:
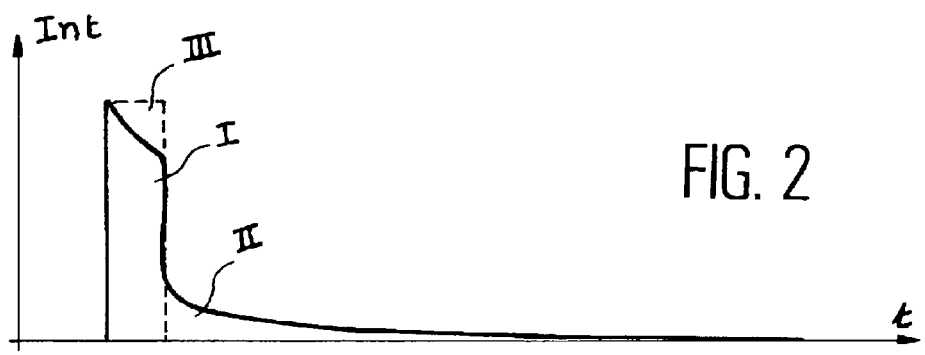
Figure 3:
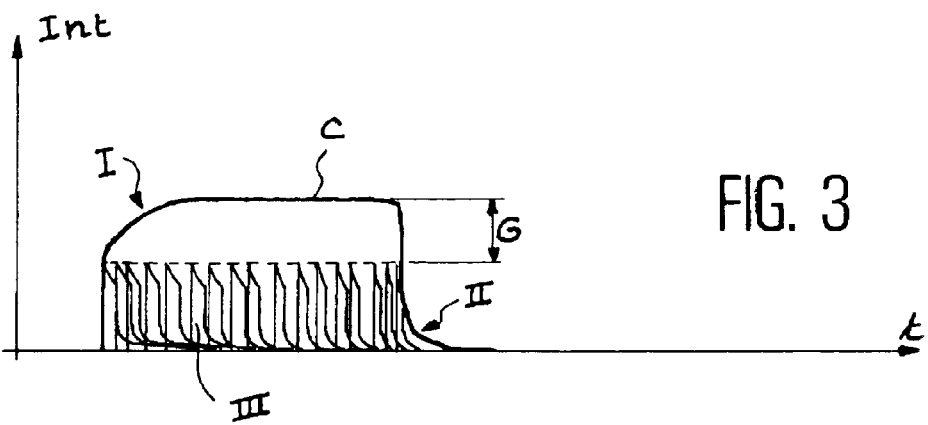

The device according to the invention, represented diagrammatically in FIG. 4, is intended to improve the electric signal produced by a detector 2. This detector 2 is intended to detect incident X-rays with reference 4 on FIG. 4. The signal improved in this way is then sent on to the input of electronic means 6 for signal processing according to the utilisation of the detector.

The detector 2 is either a simple detector such as a diode or a photoresistor, provided with polarisation means, or a complex detector, comprising a simple detector and complex means for polarisation or linkage. It is important that this complex detector should provide a current representing the current pulses provided by the simple detector it comprises.

According to the invention, an analysis is made of the current pulses provided by the detector when the latter receives particles, meaning X photons in the example under consideration. The value of the current between the pulses is the sum of the dark current and of the tail of the preceding pulses.

This value between the pulses is measured and the basic signal is subtracted, the signal issuing directly from the detector.

In the invention, it is not necessary to measure this value systematically between pulses. The invention therefore tolerates stacks of pulses, contrary to devices known in prior art where counting is carried out.

The device according to the invention, represented in FIG. 4, comprises an amplifier 8. In the example under consideration, it is a differential amplifier where the −input is connected to the output of the detector 2 whereas the +input is grounded. The output of the amplifier 8 is connected to its −input by means of a feedback impedance 10.

This impedance 10 is either a resistance of value R1, in which case a current pulse I(t) is transformed by the amplifier into a voltage pulse V(t)=R1.I(t), or a capacitor between the terminals where a resistance is set, in which case the voltage pulse provided by the amplifier output represents a sliding time average of current pulses.

The device of FIG. 4 also comprises a subtracter 12, whose +terminal is connected to the output of the amplifier 8, and also a minimum detector 14 whose input is connected to the output of the amplifier 8 and whose output is connected to the −input of the subtracter 12.

This minimum detector is shown diagrammatically in its simplest form in FIG. 4 and comprises a diode 16 and a capacitor 18, of capacity Cm, as well as a resistance 20 of value Rm, making it possible to reset the minimum with a time constant Rm, Cm.

The cathode of the diode 16 is connected to the output of the amplifier 8 whereas the anode of this diode is connected to the −input of the subtracter 12. The capacitor 18 is mounted between the anode of the diode and the earth. The resistance 20 is mounted between this anode and the +terminal of a voltage source 22, with value Vdd, making it possible to erase the detected minimum, the −terminal of this voltage source being grounded.

However, any other appropriate minimum detector can be used in the device in FIG. 4 in order to detect a voltage minimum between a voltage pulse, provided by the amplifier 8 and the following pulse (in order to use the subtracter 12, to subtract the value of this minimum from this pulse provided by the amplifier 8).

It should be noted that the tail does not disturb the present invention unless it is long relative to the length of the corresponding current pulse. In fact, if it is short relative to this time length, it does not induce any significant time lag. In practice, several orders of magnitude often exist between the length of the current pulse and the length of the tail.

On the scale of one or several pulses, the tail can then be considered as a constant, or an offset that is added to the current pulse at the output from the radiation detector 2. The minimum detector 14 makes it possible to measure this tail and the subtracter 12 can suppress it.

The time constant Rm.Cm must be set in such a way that it is shorter than a time characteristic of the evolution of the tail, both at the beginning and at the end of a given "lighting" period by photons. The evolution of the tail at the end of this lighting is generally the slowest and therefore does not constitute the adjustment criterion. The evolution at the beginning of lighting corresponds to the stacking of respective tails of photons from the beginning of the lighting.

Furthermore, the time constant must be adjusted in such a way that it is longer than the length of a pulse or a series of series of overlapping pulses, so that it does not vary significantly during the length of time of this pulse or these pulses.

There are four remarks to be made concerning the setting of the time constant.

1. If this time constant is too long relative to the photon flux, at the output from the subtracter 12 one obtains an overshoot at the beginning of the pulse. If this interferes, the time constant can be lowered or the pass band of the subtracter 12 can be limited, or that of the amplifier (reference 8 in FIG. 4) in order to eliminate this overshoot.
2. If the photon flux is high, the current pulses may overlap. The device described remains valid as long as the minimum representing the tail appears from time to time between two pulses. Evidently the time constant of the minimum detector 14 has to be adjusted so that the detected minimum does not vary too much between two of its appearances between two pulses.

It is therefore important to note that the device continues to operate during utilisation with a high photon flux, a flux when stacking is frequent, while the counting devices, that also partially solve the problems of lag, no longer function with such a flux.

3. If the photon flux is sufficiently high for the minimum only to appear very rarely, the value of the detected minimum strays progressively upwards. This reduces the signal at the output from the subtracter 12. Thus progressive attenuation of the sensitivity of the device is produced, an attenuation which is also named the "gamma function". Although this characteristic is not the main aim of the present invention, in certain cases it can be appreciable.
4. In practice, at the time of a first adjustment test, the time constant can be of the order of 30 to 300 times the length of the pulse corresponding to the detection of an X photon.

The device of FIG. 4 can be improved to reduce the noise due to the dark current.

After the subtracter 12, the unenergized level between pulses is equal to zero by construction. Nonetheless, this unenergized level retains the direct noise signal, the signal issued directly from the amplifier 8, together with the signal noise that is subtracted from this direct signal.

In the case where the continuation of the process (carried out in processing means 6) is analog, it is interesting to suppress the background noise of the output signal from the subtracter 12 by interposing, between the output of the latter and the computer processing means, appropriate means 24 for suppressing background noise, for example a base threshold system requiring that, when the output voltage from the subtracter 12 falls below a threshold voltage, the output voltage of the base threshold system 24, is equal to the threshold voltage (see FIG. 5).

Thus pulses are obtained that are certainly slightly amputated but between which there is zero noise. This is particularly important in the case of modes where the integration time is long. This background noise suppression makes it possible to limit the effective integration time to the time when photons are detected.

There also exist variants of this principle for background noise suppression. For example, it is possible to add an offset device 26 on the minimum detection line (for example between the output from the amplifier 8 and the input of the minimum detector 14) as seen in FIG. 5, such that the result of the mathematical subtraction is negative for the unenergized level between pulses. This makes it possible to choose a zero V threshold value for the base threshold system 24.

The utilisation of the pulses provided by the subtracter and relieved of their tail and their dark current depends on the application for which the invention is to be used. Among others, one can cite an analog integration (by means of an integrator) and a counting. In the case where counting is required, suppression of the tail and the dark current makes it possible for the analog threshold intended to activate the counting to be clearly defined. Another possible application is a spectrometry and in this case, the fact of taking off the tail, which is little known, improves the energy resolution.

Figure 6:
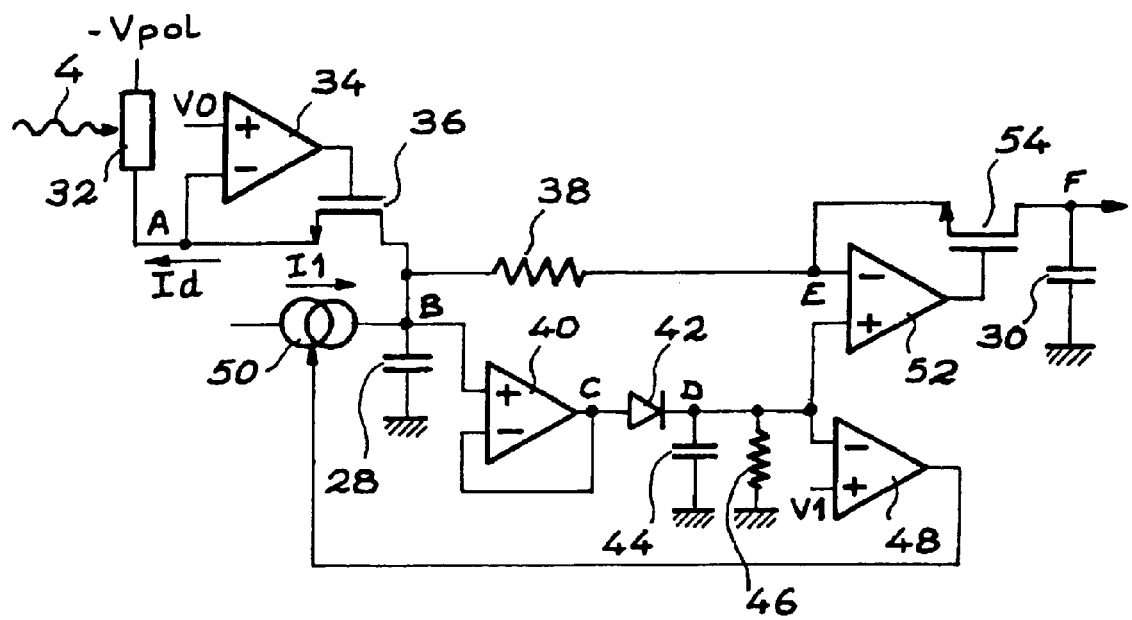
FIG. 6 illustrates diagrammatically an example of the device according to the invention.
Figure 8:
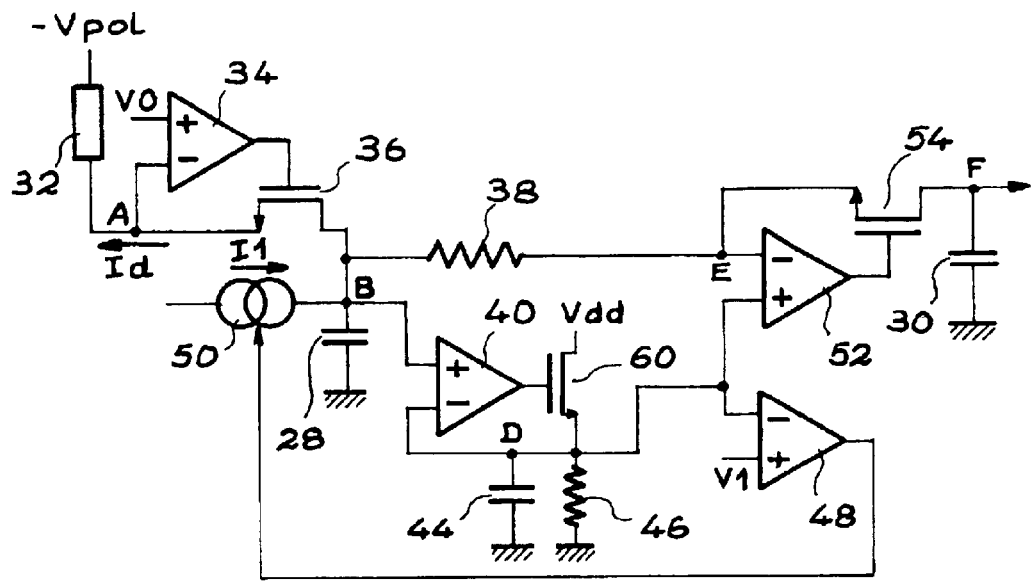
FIG. 8 illustrates diagrammatically a variant of the device of FIG. 6.
Figure 9:
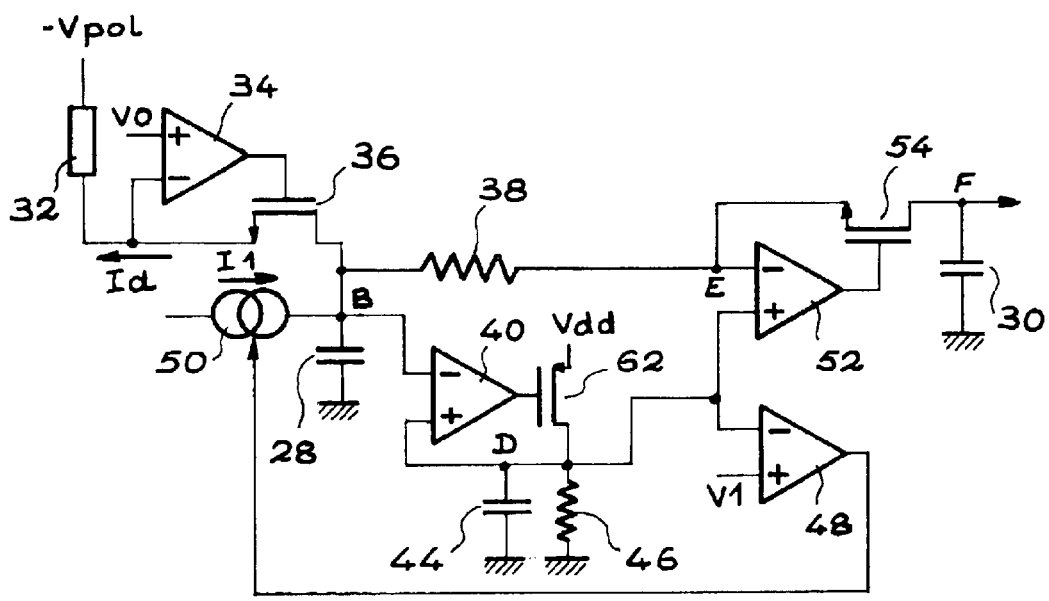
FIG. 9 illustrates diagrammatically another variant of the device of FIG. 6.

The devices according to the invention that are shown diagrammatically in FIGS. 6, 8 and 9, are directly inspired by the device of FIG. 4 but nonetheless are more complex than the latter. For example, there are four amplifiers instead of the amplifier 8 and the subtracter 12 of FIG. 4, this subtracter being able to be formed, for example, with two amplifiers.

On the other hand, the device in FIG. 6 has the advantage of working with charges. In fact, given the charges produced in the detector 2 when the latter receives X photons, this device makes it possible to transfer these charges to a capacitor 28 and then to another capacitor 30 without modifying these charges. The total charge arriving on the capacitor 30 therefore does not depend on the exact values of the components utilised (resistances, capacitors, offsets and amplifier gains).

In the case where several detectors 2 of X photons are used, forming for example a strip or a matrix, each of these detectors having a reading stage, it is of interest to continue using the charges produced in the detectors, placed after the capacitors 30 associated respectively with the detectors.

For example, it is possible to transfer, one after the other, the charges accumulated in the capacitors 30, in a single device for conversion of charges into voltages. This is shown diagrammatically in FIG. 7, and this will be explained later. Thus one has an computer reading means that does not disturb the homogeneity of the detectors by its own dispersals.

Returning to the device of FIG. 6: in FIG. 6 a detector 32 can be seen, intended to detect the radiation 4 constituted of X photons. This detector 32 is a photoconductor whose cathode is polarised by a negative high voltage—Vpol and whose anode terminal A is connected to a device in conformity with the invention. The detector 32 provides the device according to the invention (reader circuit) with an electron flux. This results in a current Id output from the device in the conventional current direction.

The device in conformity with the invention in FIG. 6 comprises a first differential amplifier 34 whose +input is set at a voltage V0 of the order of 1 V and whose −input is connected to the anode A. This device also comprises an N type MOS transistor 36, whose gate, drain and source are connected respectively to the output from the amplifier 34, to a terminal B and to the terminal of the anode A.

The device also includes a resistor 38 connected between the terminal B and another terminal E of the device. This device also comprises the capacitor 28, connected between the terminal B and the earth, as well as a second differential amplifier 40 with its +input connected to the terminal B and with its −input connected to the output terminal C of this amplifier. Furthermore, the device comprises:

a diode 42 with its anode connected to the terminal C and the cathode to a terminal D.

a capacitor 44 mounted between the terminal D and ground, a resistor 46 mounted between the terminal D and ground, a third differential amplifier 48 with its −input connected to the terminal D and its +input set at voltage V1.

a current generator 50 provided for producing a current I1 at the terminal B and controlled by the output from the amplifier 48, a fourth differential amplifier 52 with its −input connected to the terminal E of the device and its +input connected to terminal D, another N type MOS transistor 54, whose source, drain and gate are connected respectively to the terminal E, the output terminal F of the device and to the output from the amplifier 52, and the capacitor 30 mounted between the terminal F and ground.

The terminal F is connected to computer means (not shown) for processing the signal provided by the detector 32 and improved thanks to the device in conformity with the invention.

The electron flux described above is injected into the capacitor 28 by means of the transistor 36 that is polarised by the amplifier 34.

The function of this amplifier 34 is to raise terminal A to the voltage V0, to facilitate injection of the flux of electrons through the transistor, lowering the apparent impedance of this transistor 36, and reducing the injection noise through this transistor 36.

The assembly formed by the amplifier 34, the transistor 36 and the capacitor 28 fulfills the function of the amplifier 8 and the impedance 10 of the device shown in FIG 4.

However, it should be noted that the device in FIG. 6 is not an inverter, contrary to that in FIG. 4. Thus at the terminal B, one obtains a negative voltage pulse for each X photon detected (whereas the voltage pulse obtained at the amplifier output 8 of FIG. 4 is positive).

In this case, in order to implement the invention, a maximum detector must be provided instead of a minimum detector.

This maximum detector is formed by the amplifier 40, the diode 42, the capacitor 44 and the resistor 46. Relative to the device in FIG. 4, the amplifier 40 (follow-up amplifier) has been added in the case of FIG. 6, because the information available at terminal B is under high impedance. This information is only constituted by the voltage developed on the capacitor 28 by the injected charge. The time constant R2.C2, where R2 is the value of the resistance 46 and C2 the capacity of the capacitor 44, equals for example 30 $\mu$sec if the length of the pulse corresponding to a pulse due to an X photon is of the order of 1 $\mu$sec.

In the case of FIG. 6, the subtracter is constituted of the amplifier 52, the resistor 38, the transistor 54 and the capacitor 30. The pulse part of the charge arriving on the capacitor 28 is thus injected into the capacitor 30 through the resistor 38 and the transistor 54.

The amplifier 52 has two functions:

by feedback, it brings the potential of the terminal E equal to that of the terminal D, that is to the maximum established between pulses and therefore it is thanks to this amplifier that only the pulse part of the signal is injected into the capacitor 30, and it accelerates injection through the transistor 54 by reducing its apparent impedance.

The time constant R1.C1, where R1 is the value of the resistor 38 and C1 is the capacity of the capacitor 28, is chosen so as to obtain the order of magnitude of the pulse lengths, for example a few hundreds of nanoseconds.

In fact, this time constant must not be too short in order that a pulse of electrons injected into the capacitor 28 has the time to develop a voltage pulse on this capacitor 28, thus allowing measurement of the voltage maximum between pulses with the maximum detector before being evacuated towards the capacitor 30 through the resistor 38.

This resistor 38 also makes it possible, in the case of variation of the dark current, for a voltage difference to appear at terminal B and to be measurable by the maximum detector.

Thus, the tail and the dark current have been subtracted before injection into the capacitor 30, but this tail and this dark current build up in this capacitor 30 and make the potential at terminal B vary.

In order to avoid saturation in this terminal B, it is therefore necessary to evacuate a flux of electrons from this terminal B having an average value equal to the sum of the tail and the dark current. To do this, it is possible to lock in the value of the detected maximum to the voltage V1 by means of the amplifier 48 and the controlled current source 50.

Figure 7:
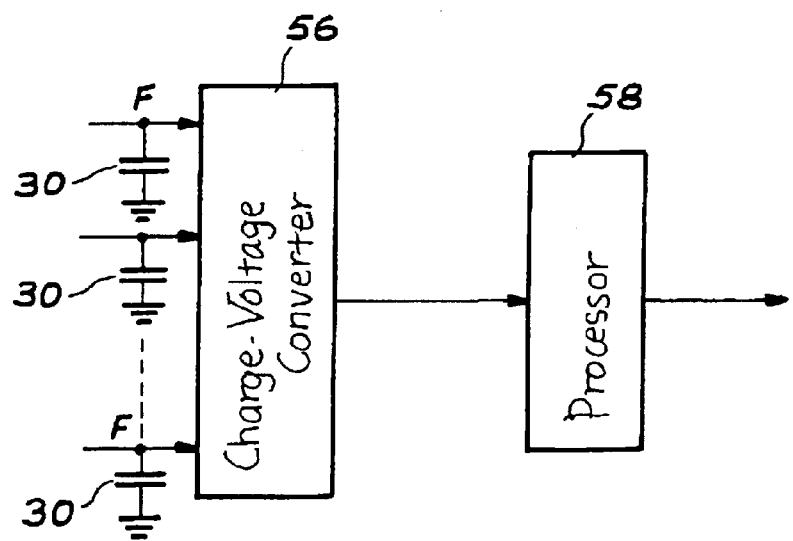
FIG. 7 is a diagrammatic and partial view of another device according to the invention, that is associated with several detectors.

Returning to FIG. 7, this concerns the processing of signals provided by several detectors (not shown), of the type of detector 32 in FIG. 6. These detectors are respectively followed by devices according to the invention. Only the respective capacitors 30 of these devices are shown in FIG. 7.

The outputs F from these devices are connected respectively to the inputs of a single device 56 for converting charges to voltages. The signals provided by this device 56 are processed in the appropriate means 58, depending on the application of the detectors used.

FIGS. 8 and 9 are variants of the device in FIG. 6 and differ only because of the method of producing the maximum detector. It should be noted that these embodiments of the maximum detector are known to those skilled in the art and are only given as an example: other maximum detectors can be used in the invention.

In the example in FIG. 8, the diode 42 is replaced by an N type MOS transistor 60. Such a transistor is often simpler to produce than a diode. It can be seen that the gate of this transistor 60 is connected to the output of the amplifier 40, that its drain is set at a voltage Vdd by means not shown here, and that its source is connected to the terminal D of the device. This terminal D is also connected to the −input of the amplifier.

The example in FIG. 9 shows another variant of FIG. 6 in which the diode 42 is replaced by a P type MOS transistor 62 with its gate still connected to the output of the amplifier 40, the source being brought to the voltage Vdd and the drain being connected to the terminal D. It can be seen that, in the case of FIG. 9, the inputs to the amplifier 40 must be inversed relative to the example in FIG. 8.

Concerning the device of FIG. 8, the maximum detector used in the example of FIG. 9 is able to operate over a greater voltage range.

In a third variant of FIG. 6 (not shown), the resistor 38 is suppressed: the role of this resistor is then fulfilled by the input resistor of the assembly formed by the fourth amplifier 52 and the transistor 54.

The present invention is not limited to devices intended to be associated with X ray detectors. The examples of the invention provided can be adapted to detectors of γ photons or other particles.

Furthermore, the invention is not limited to devices intended to be associated with detectors for providing electrons when they receive particles. The given examples can be adapted to detectors intended for providing holes. In particular, the diagrams of FIGS. 4 to 9 relate to electrons but can easily be adapted to holes by those skilled in the art, in particular by changing the diode direction and by changing the ground reference to voltage reference.

What is claimed is:

1. Device for improving a signal provided by a particle detector (2, 32), said detector being able to provide current pulses when said detector receives particles, said device comprising means (8, 10; 28, 34, 36) for transforming current pulses into voltage pulses, said device being characterised by further comprising:

means (16, 18; 40, 42-60-62, 44) for detection of a voltage extremum between a voltage pulse provided by the transforming means and a following voltage pulse, means (12; 30, 52, 54) for subtracting the value of the extremum thus detected from the voltage pulse provided by the transforming means, in such a way as to improve the corresponding signal, provided by the detector, and means (20, 46) for resetting the extremum.

2. Device according to claim 1, wherein the transforming means comprises an amplifier (8) provided with a feedback impedance (10).

3. Device according to claim 2, wherein the feedback impedance (10) is a resistor.

4. Device according to claim 2, wherein the feedback impedance (10) is a capacitor with a resistor mounted between terminals thereof.

5. Device according to claim 1, wherein the transforming means comprises:

a first capacitor (28), a first transistor (36) through which charges produced in the detector, by the particles detected by the detector, are transferred to the first capacitor, and a first amplifier (34) adapted to polarize the first transistor.

6. Device according to claim 1, wherein the means for detection of the voltage extremum comprises:

a diode (16), mounted between the transforming means output and the subtracting means, and a capacitor (18), mounted between a continuous voltage source and a terminal common to both the subtracting means and the diode.

7. Device according to claim 1, wherein the means for detection of the voltage extremum comprises:

a second amplifier (40) connected to a first capacitor, a second capacitor (44) mounted between the output of the extremum detection means and a continuous voltage source, a resistor (46) mounted between the output of the extremum detection means and the continuous voltage source, means for voltage rectification (42-60-62) connecting the second amplifier to the second capacitor, and a third amplifier (48) adapted to lock in the value of the extremum detected at a predefined voltage.

8. Device according to claim 7, wherein the voltage rectification means are chosen from amongst a diode (42), an N type MOS transistor (60) and a P type MOS transistor (62).

9. Device according to claim 1, wherein the subtracting means comprises:

a capacitor (30), a transistor (54) through which a pulse part of charges arriving at another capacitor is sent on to the third capacitor, and an amplifier (52) provided for reducing an apparent impedance of the transistor.

10. Device according to claim 9, wherein the subtracting means further comprises a resistor (38) mounted between said another capacitor and the transistor.

11. Device according to claim 1, wherein the resetting means comprises a resistor (20) mounted between a terminal of the subtracting means and a voltage source (22).

12. Device according to claim 1, further comprising means (24) for suppressing a background noise which is susceptible to disturb the signal provided by the subtracting means.

13. Device according to claim 12, wherein the noise suppressing means comprises means for voltage offset (26) of the signal, placed between the output of the transforming means and a terminal of the subtracting means.

14. Device according to claim 1, wherein the particle detector is a photon detector.

* * * * *